US008794071B2

(12) United States Patent
Inoue et al.

(10) Patent No.: US 8,794,071 B2
(45) Date of Patent: Aug. 5, 2014

(54) ULTRASONIC WAVE SENSOR AND METHOD FOR ATTACHING ULTRASONIC WAVE SENSOR

(75) Inventors: Satoru Inoue, Tokyo (JP); Tomonori Kimura, Tokyo (JP); Kouji Ibata, Tokyo (JP); Yukio Nishimoto, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 374 days.

(21) Appl. No.: 13/395,903

(22) PCT Filed: Jan. 21, 2010

(86) PCT No.: PCT/JP2010/000319
§ 371 (c)(1),
(2), (4) Date: Mar. 14, 2012

(87) PCT Pub. No.: WO2011/089644
PCT Pub. Date: Jul. 28, 2011

(65) Prior Publication Data
US 2012/0180569 A1   Jul. 19, 2012

(51) Int. Cl.
*G01N 29/09*   (2006.01)
*B60R 19/48*   (2006.01)

(52) U.S. Cl.
CPC .................... *B60R 19/483* (2013.01)
USPC .............................. 73/589; 73/649

(58) Field of Classification Search
USPC ........................... 73/589, 632, 649
See application file for complete search history.

(56) References Cited

U.S. PATENT DOCUMENTS

| 7,583,563 | B2 * | 9/2009 | Nakajima | 367/188 |
| 7,612,485 | B2 * | 11/2009 | Sugiura et al. | 310/324 |
| 7,614,305 | B2 * | 11/2009 | Yoshioka et al. | 73/627 |
| 7,628,076 | B2 * | 12/2009 | Nakano et al. | 73/643 |
| 7,696,672 | B2 * | 4/2010 | Sugiura et al. | 310/334 |
| 8,516,911 | B2 * | 8/2013 | Inoue et al. | 73/866.5 |
| 2007/0062292 | A1 | 3/2007 | Sato et al. | |
| 2007/0115758 | A1 | 5/2007 | Kojima et al. | |

FOREIGN PATENT DOCUMENTS

| JP | 62-240890 A | 10/1987 |
| JP | 10-123236 A | 5/1998 |
| JP | 2001-258097 A | 9/2001 |
| JP | 200384182 * | 10/2003 |
| JP | 2004-104521 A | 4/2004 |
| JP | 2004-264221 A | 9/2004 |
| JP | 2007-114182 A | 5/2007 |
| JP | 2007-147319 A | 6/2007 |

* cited by examiner

*Primary Examiner* — J M Saint Surin
(74) *Attorney, Agent, or Firm* — Birch, Stewart, Kolasch & Birch, LLP

(57) ABSTRACT

An ultrasonic sensor of the present invention is attached to the back face of a bumper 4, and provided with a matching member 3 that is in intimate contact with the ultrasonic wave transmitting surface of the ultrasonic sensor and the opposing face of the bumper 4 and that has an acoustic impedance smaller than each of the impedances of the sensor and the bumper.

10 Claims, 5 Drawing Sheets

ULTRASONIC WAVE SENSOR AND METHOD FOR ATTACHING ULTRASONIC WAVE SENSOR

TECHNICAL FIELD

The present invention relates to an ultrasonic sensor and a method of attaching an ultrasonic sensor to a back face of a bumper.

BACKGROUND ART

As this conventional type of ultrasonic sensor, there are examples disclosed in Patent Document 1 to Patent Document 3, for instance. An example disclosed in Patent Document 1 has a structure such that a recess (concavity) is prepared in the back face of a bumper, and that one face of a ceramic 8 for generating an ultrasonic wave that is not come into contact with a metal base 9 (hereinafter, referred to as "surface of ceramic") is pressed against the face of the recess on the back side of the bumper by the metal base 9 and a pressure cover 27, or a pressure leaf spring 34.

An example disclosed in Patent Document 2 has a structure such that when a recess is formed in a bumper, a vibrating face of an ultrasonic element is directly brought into intimate contact therewith to be stuck and fixed by adhesive. Also, an example disclosed in Patent Document 3 has a structure such that a projection is provided on the bottom (transmitting surface) of an ultrasonic sensor, and that the projection is brought in contact with a mounting member.

PRIOR ART DOCUMENTS

Patent Documents

Patent Document 1: JP-A-1998-123236 (JP-A-10-123236)
Patent Document 2: JP-A-1987-240890 (JP-A-62-240890)
Patent Document 3: JP-A-2007-147319

However, in the structure disclosed in Patent Document 1, since the contact condition between the back face of the bumper and the surface of ceramic is not made uniformly, an air layer is produced therebetween; thus, there is a drawback such that the transmission efficiency of the ultrasonic wave is lowered. Further, when the surface precision on the face of the recess in the back face of the bumper is deteriorated, there is a problem such that the variation of the transmission efficiency is increased.

On the other hand, in the structure disclosed in Patent Document 2, an ultrasonic sensor element is completely fixed, which makes it impossible to replace the ultrasonic sensor element due to a failure and so on. Moreover, a thin portion of the bumper is also used for a vibration surface for ultrasonic waves; thus, in order to generate a frequency of 40 kHz band having a good propagating efficiency as air ultrasound, it is required that the ultrasonic sensor element have an increased thickness and bore to be unpractical, which poses a problem.

Further, in the structure disclosed in Patent Document 3, the transmission range of ultrasonic waves is narrowed down in the projection to secure desired directivity; however, a boding method is unclear. Moreover, when the sensor is fixed to the back face of the bumper by hardening, the mass of the vibrating portion is increased, so that the resonance frequency (the transmission frequency of the ultrasonic wave) easily varies, and also varies depending on the fixed condition, which poses a problem.

The present invention has been made to solve the above-mentioned problems, and an object of the invention is to provide an ultrasonic sensor and an attaching method of an ultrasonic sensor having reduced variations in resonance frequency such that improved and stabilized transmission efficiency thereof can be intended.

SUMMARY OF THE INVENTION

An ultrasonic sensor of the present invention is provided with a matching member having an acoustic impedance smaller than each of the impedances of a bumper and an ultrasonic sensor on an ultrasonic wave transmitting surface thereof, wherein the matching member is composed of a member having a first acoustic impedance and a member having a second acoustic impedance, an aspect ratio is provided in the shape of the contact surface between at least one of the members and the bumper, and the acoustic impedances of the members is given by the following relation:

$$Z21 \gg Z22$$

where
$Z21$ is the acoustic impedance of a first member in the central portion thereof, and $Z22$ is the acoustic impedance of a second member in the peripheral portion thereof.

A method of attaching an ultrasonic sensor of the invention includes the steps of disposing an ultrasonic sensor at a predetermined position on the back face of a bumper; pressing a flange of a metal casing that is a constituent element of the ultrasonic sensor with a fixing member; and fixing the fixing member to the bumper under the condition where the flange thereof is pressed.

Effect of the Invention

According to the ultrasonic sensor of the invention, since the matching member having the acoustic impedance smaller than each of the impedances of the bumper and the ultrasonic sensor is provided on the ultrasonic wave transmitting surface thereof, the ultrasonic sensor can be attached directly to the back face of the bumper without preparing a through hole through the bumper to detect an obstacle; thus, the ultrasonic sensor is not exposed from the front face of the bumper to enhance the designablity of the bumper.

Further, since the matching member is interposed between the opposing faces of the ultrasonic sensor and the bumper, indirect intimate contact therebetween is increased, which enables to reduce variations in transmission efficiency.

According to the ultrasonic sensor of the invention, the acoustic impedances of the ultrasonic wave transmitting surface of the ultrasonic sensor, the matching member, the bumper, and air are given by the following relations to thus enhance the transmission and reception efficiencies of ultrasonic waves:

$$Z1 > Z2 < Z3$$

$$Z2 > Zair$$

where
$Z1$ is the acoustic impedance of the transmitting surface (metal casing) of the ultrasonic sensor,
$Z2$ is the acoustic impedance of the matching member,
$Z3$ is the acoustic impedance of the bumper, and
$Zair$ is the acoustic impedance of the air.

The method of attaching an ultrasonic sensor according to the invention includes the steps of: disposing an ultrasonic sensor at a predetermined position on the back face of a bumper, pressing a flange of a metal casing that is a constituent element of the ultrasonic sensor with a fixing member, and fixing the fixing member to the bumper under the condition where the flange thereof is pressed; as a result, a distance between the back face of the bumper and the ultrasonic wave transmitting surface of the ultrasonic sensor, namely, a thickness of the matching member, is maintained at a certain distance. Moreover, since the pressurization condition therebetween can be controlled, the transmission and reception efficiencies of the ultrasonic waves is stabilized to enhance the reliability thereof.

BEST MODE FOR CARRYING OUT THE INVENTION

In the following, an embodiment of the present invention will next be described with reference to the drawings.

First Embodiment

Figure 1:
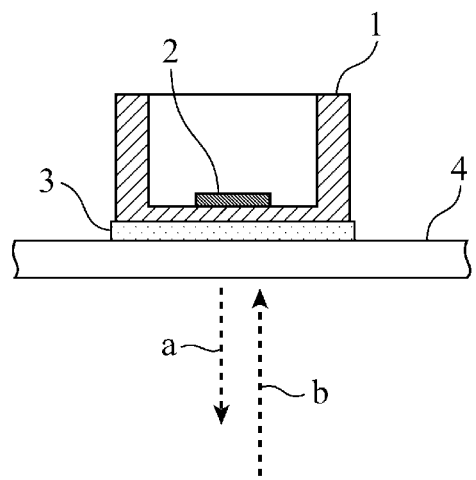
FIG. 1 is a conceptual view showing an attaching state of an ultrasonic sensor of the present invention.

FIG. 1 is a conceptual view showing an ultrasonic sensor of the present invention; it is configured as follows: a PZT (lead zirconate titanate) 2 is provided in the center at the bottom of a cup-shaped metallic casing 1, and a matching member 3 is in intimate contact with the opposing faces between the metallic casing 1 and a bumper 4 and has an acoustic impedance smaller than each of their acoustic impedances.

In the ultrasonic sensor thus constructed, the ultrasonic waves emitted from the transmitting/receiving surface of the metallic casing 1 pass through the matching member 3 and the bumper 4 to travel in the direction of an arrow "a." Then, when the ultrasonic waves impinge on an obstacle and so on (not shown) to be reflected therefrom, the reflected wave travels in the direction of an arrow "b," passes through the bumper 4 and the matching member 3 to be incident on the PZT 2 through the receiving surface of the metallic casing 1.

In this case, in order to increase the transmission and reception efficiency of the ultrasonic waves, the acoustic impedances of the ultrasonic wave transmitting surface of the ultrasonic sensor, the matching member, the bumper, and air are given by the following relations:

$$Z1 > Z2 < Z3$$

$$Z2 > Z_{air}$$

where $Z1$ is the acoustic impedance of the transmitting surface (metal casing) of the ultrasonic sensor, $Z2$ is the acoustic impedance of the matching member, $Z3$ is the acoustic impedance of the bumper, and $Z_{air}$ is the acoustic impedance of air.

Figure 2:
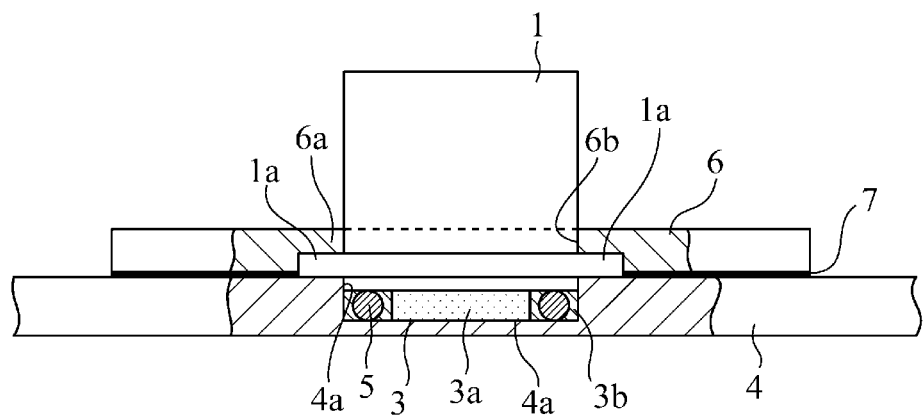
FIG. 2 is a sectional view showing a state where an ultrasonic sensor in accordance with a first embodiment of the invention is attached to the back face of a bumper.

FIG. 2 shows a state where the ultrasonic sensor in accordance with the first embodiment is attached to the back face of the bumper; the matching member 3 is fitted in a recess 4a formed in the back face of the bumper 4, and a flange 1a of the metallic casing 1 is abutted against the back face of the bumper 4. Then, a fixing ring 6 having a hole 6b through which the metallic casing 1 is passed is fitted over the metallic casing, and under the condition where a flange 6a in the vicinity of the hole 6b is abutted against the flange 1a of the metallic casing 1, the fixing ring 6 is bonded and fixed to the back face of the bumper 4 with adhesive 7.

The matching member 3 is composed of matching members 3a, 3b having two types of acoustic impedances, and the acoustic impedances of the matching members 3a, 3b are given by the following relation:

$$Z21 \gg Z22$$

where $Z21$ is the acoustic impedance of the first matching member in the central portion thereof, and $Z22$ is the acoustic impedance of the second matching member in the peripheral portion thereof.

In this case, defoamed silicone is employed for the first matching member 3a in the central portion, and foamed polystyrene or foamed silicone is employed for the second matching member 3b in the peripheral portion; otherwise, the matching members can be achieved by members having different acoustic impedances even in the members having the same property. In this instance, the matching member 3 having adhesiveness and thixotropy (the member having a small change of the form due to its surface tension) is more preferable.

Figure 3:
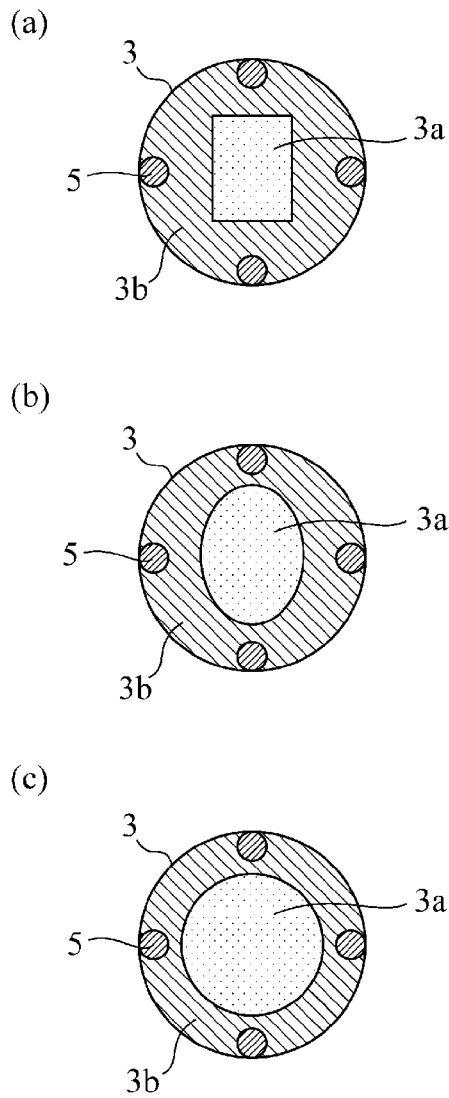
FIG. 3 is a plan view of a matching member employed for the ultrasonic sensor in accordance with the first embodiment.

Then, an aspect ratio is provided in the shape of the contact surface between the first matching member 3a and the back face of the bumper 4. FIGS. 3 (a), (b), and (c) are shown such that the shapes of the first matching members 3a in the central portion are changed with respect to the second matching member 3b in the peripheral portion; FIG. 3 (a), FIG. 3 (b), and FIG. 3 (c) are provided with a quadrangular, an elliptic, and a circular shape, respectively, and each have a different aspect ratio in the contact surface with the back face of the bumper 4.

Solid matters 5, e.g., glass or metal, having a spherical shape or a polygonal shape and arranged at substantially equal intervals are mixed in the second matching member 3b in the peripheral portion.

As discussed above, in accordance with the first embodiment, since the ultrasonic sensor can be attached directly to the back face of the bumper 4 without providing a through hole through the bumper 4 to thus detect an obstacle, the ultrasonic sensor is not exposed from the front face of the bumper to enhance the designablity in the bumper 4.

In addition, the acoustic impedance Z1 of the transmitting surface (metal casing) of the ultrasonic sensor, the acoustic impedance Z2 of the matching member, the acoustic impedance Z3 of the bumper 4, and the acoustic impedance Zair of air are given by the following relations:

Z1>Z2<Z3

Z2>Zair.

In such a way, the transmission and reception efficiencies of the ultrasonic waves can be improved.

Further, the matching member 3 is composed of the first matching member 3a in the central portion and the second matching member 3b in the peripheral portion having two types of acoustic impedances, and the acoustic impedance Z21 of the first matching member 3a in the central portion and the acoustic impedance Z22 of the second matching member 3b in the peripheral portion are given by the relation: Z21 » Z22. In such a way, the transmission and reception efficiencies of the ultrasonic waves can be enhanced and the directivity of the ultrasonic waves can be changed.

Hereupon, in some environments where the ultrasonic sensor is installed, the acoustic impedance Z1 of the transmitting surface (metal casing) of the ultrasonic sensor, the acoustic impedance Z2 of the matching member, the acoustic impedance Z3 of the bumper 4, and the acoustic impedance Zair of air may be given by the following relation:

Z1>Z2>Z3 or

Z1<Z2<Z3.

Further, when the solid matters 5 are mixed into the matching member 3, a distance between the back face of the bumper 4 and the ultrasonic wave transmitting surface of the metal casing 1, namely, a thickness of the matching member 3, is kept at a certain distance; thus, the transmission and reception efficiencies of the ultrasonic waves is stabilized to enhance the reliability thereof.

Second Embodiment

Figure 4:
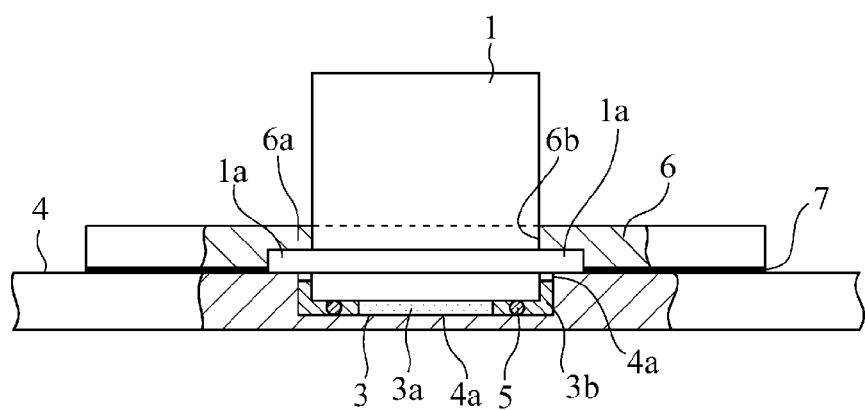
FIG. 4 is a sectional view showing a state where an ultrasonic sensor in accordance with a second embodiment of the invention is attached to the back face of a bumper.

FIG. 4 shows a state where an ultrasonic sensor in accordance with a second embodiment of the present invention is attached to the back face of a bumper 4; a second matching member 3b in the peripheral portion is formed in the shape of a cup to provide a structure (cap structure) that hangs over the ultrasonic wave transmitting/receiving surface of a metallic casing 1.

In accordance with the second embodiment, since the ultrasonic wave transmitting/receiving surface of the metallic casing 1 is covered with the second matching member 3b, the ultrasonic sensor can be easily attached to a recess 4a in the back face of the bumper 4.

Further, there is an advantageous effect that components of ultrasonic wave that propagate in the direction of the thickness of the bumper are reduced, which enables to remove the radiation of unnecessary ultrasonic waves.

Third Embodiment

Figure 5:
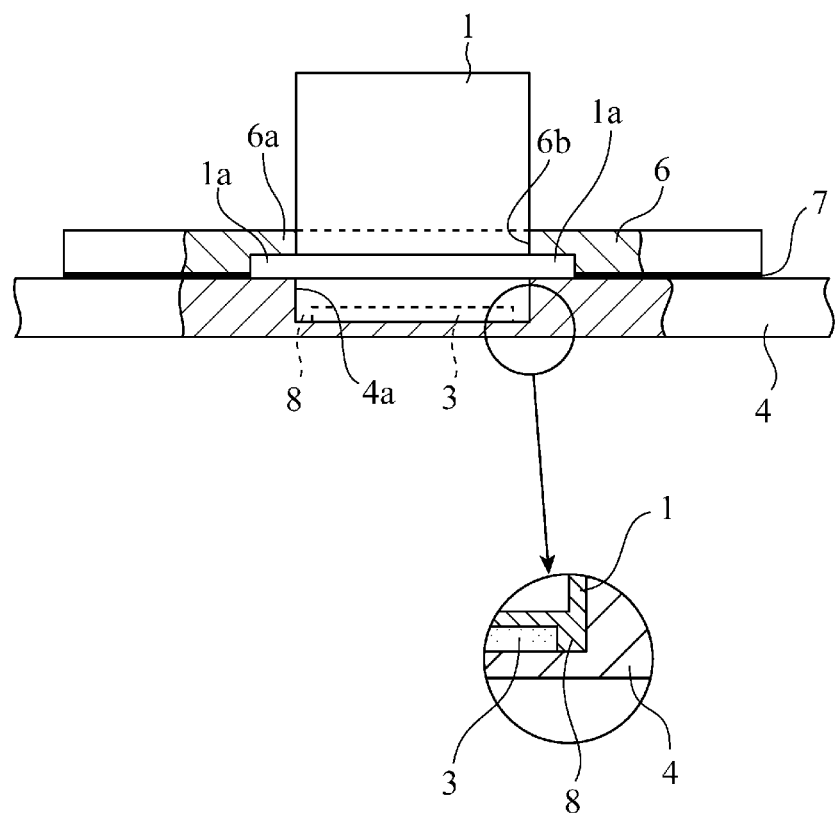
FIG. 5 is a sectional view showing a state where an ultrasonic sensor in accordance with a third embodiment of the invention is attached to the back face of a bumper.

FIG. 5 shows a state where an ultrasonic sensor in accordance with a third embodiment is attached to the back face of a bumper 4; it is configured that projections 8 each having a height substantially equal to the thickness of a matching member 3 are provided in the vicinity of the ultrasonic wave transmitting/receiving surface of a metallic casing 1. The projections 8 are provided at equal intervals in the vicinity of the ultrasonic wave transmitting/receiving surface of a metallic casing 1 as shown in FIG. 6(a). Alternatively, as shown in FIG. 6(b), the projection is formed in the shape of a ring to enclose the vicinity of the matching member 3 with a height substantially equal to the thickness of the matching member. Otherwise, when the matching member 3 is formed in an elliptic shape as shown in FIG. 6(c), or when the matching member 3 is formed in a quadrangular shape as shown in FIG. 6(d), the projection is formed with a height substantially equal to the thickness of the matching member 3 to surround the matching member.

In accordance with the third embodiment, since a distance between the back face of the bumper 4 and the ultrasonic wave transmitting and receiving surface 1a of the metallic casing 1, namely, a thickness of the matching member 3, is maintained constant, the pressurization condition of the matching member 3 can be controlled; thus, the transmission and reception efficiencies of the ultrasonic waves are stabilized to enhance the reliability thereof.

Fourth Embodiment

Figure 6:
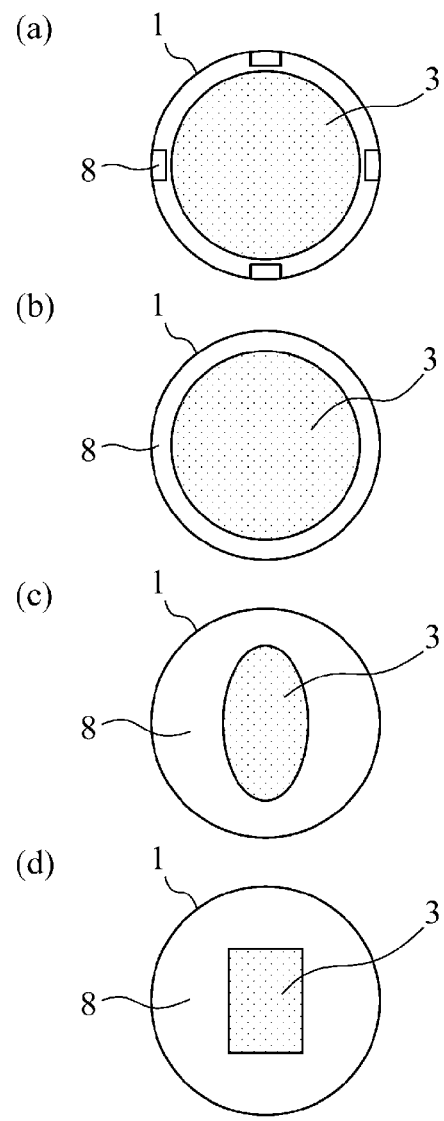
FIG. 6 is a plan view of a matching member employed for the ultrasonic sensor in accordance with the third embodiment.
Figure 7:
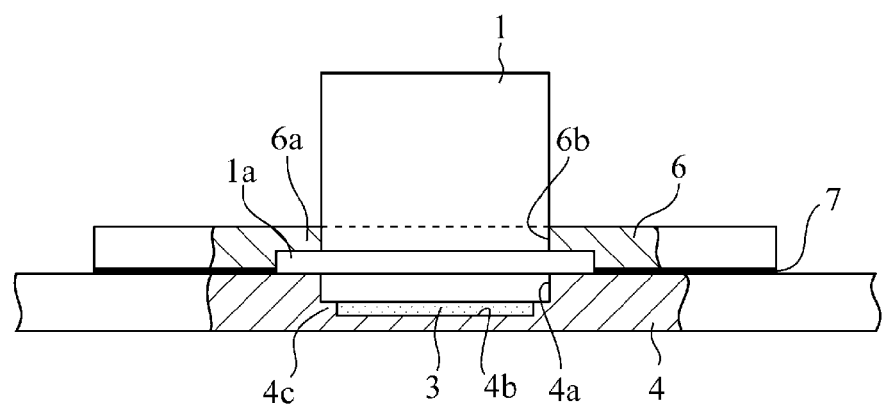
FIG. 7 is a sectional view showing a state where an ultrasonic sensor in accordance with a fourth embodiment of the invention is attached to the back face of a bumper.

FIG. 7 shows a state where an ultrasonic sensor in accordance with a fourth embodiment is attached to the back face of a bumper 4; it is configured that a recess 4b having a diameter smaller than that of a recess 4a is provided on the bottom surface of the recess 4a formed in the back face of the bumper 4 to have a depth substantially equal to the thickness of the matching member, and that the peripheral portion of the ultrasonic wave transmitting/receiving surface 1a of the metallic casing 1 is received by a projection 4c located around the recess 4b, in other words, the bottom surface of the recess 4a. In this instance, the planar shape of a matching member 3 may be any one of a circular, an elliptic, and a quadrangular one as shown in FIG. 6 (a) to FIG. 6 (d), the other shapes, and the like.

In accordance with the fourth embodiment, since the ultrasonic wave transmitting/receiving surface of the metallic casing 1 is received by the projection 4c around the recess, and in the assembly, the matching member 3 is not pressurized more than necessary, the pressurization condition of the matching member 3 can be controlled; thus, the transmission and reception efficiencies of the ultrasonic waves are stabilized to increase the reliability thereof.

Fifth Embodiment

Figure 8:
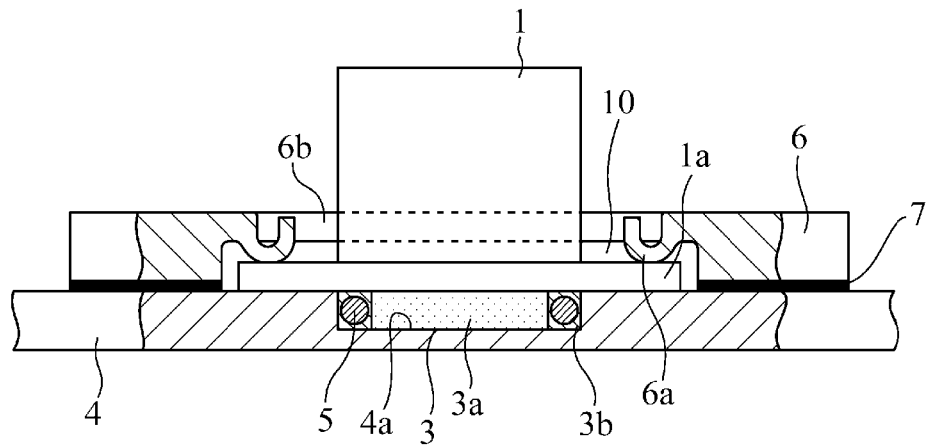
FIG. 8 is a sectional view showing a state where an ultrasonic sensor in accordance with a fifth embodiment of the invention is attached to the back face of a bumper.

FIG. 8 shows a state where an ultrasonic sensor in accordance with a fifth embodiment is attached to the back face of a bumper 4; a matching member 3 is fitted in a recess 4a formed in the back face of the bumper 4, and a flange 1a of a metallic casing 1 is abutted against the back face of the bumper 4. The following is configured: a fixing ring 6 has a hole 6b through which the metallic casing 1 is passed; a flange 6a located around the hole 6b has a gap 10 formed between the flange and the flange 1a of the metallic casing 1, and also the peripheral portion of the flange 6a is bent in a U-shape in cross section to have resiliency; and the flange 1a is pressed against the back face of the bumper 4 by the end portion of the U-shaped bent portion.

In accordance with the fifth embodiment, since the flange 1a of the metallic casing 1 is pressed against the back face of the bumper 4 with the resiliency on the fixing ring 6 side, a distance between the back face of the bumper 4 and the ultrasonic wave transmitting/receiving surface of the metallic casing 1, namely, a thickness of the matching member 3, can be maintained constant, and the pressurization condition of the matching member 3 can be controlled, and the transmission and reception efficiencies of the ultrasonic waves are stabilized to increase the reliability thereof.

Hereupon, as shown in the first, second, and fifth embodiments discussed above, the matching member 3 is composed of the matching members 3a, 3b having two types of acoustic impedances, pressure-sensitive rubber is used for the matching member 3b in the peripheral portion thereof, the matching member 3b in the peripheral portion is pressed with the flange 6a of the fixing ring 6 to be attached to the back face of the bumper 4, and thereby the pressurization can be set properly.

Figure 9:
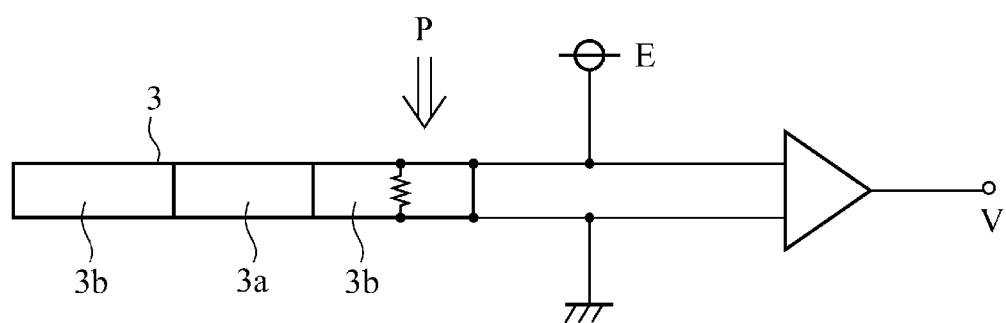
FIG. 9 is a circuit diagram for monitoring the pressurization condition between the ultrasonic sensor and the bumper.
Figure 10:
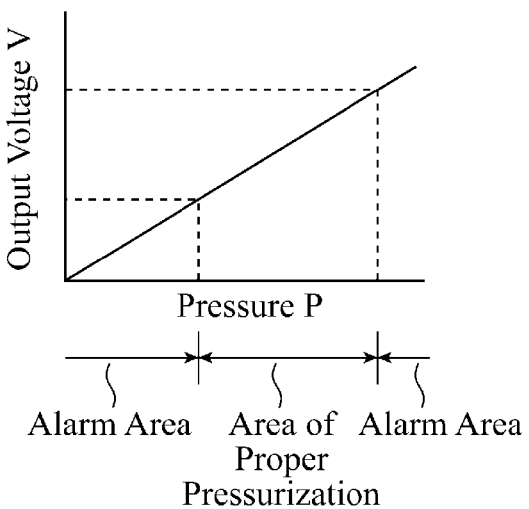
FIG. 10 is a characteristic graph showing the change of output voltage versus the pressurizing pressure.

FIG. 9 shows a circuit for monitoring the pressurization by way of example; as shown in FIG. 10, since in the matching member 3b in the peripheral portion made of the pressure-sensitive rubber the output voltage V is changed relative to an applied pressure P under the condition to which a certain voltage E is applied, the pressure P to be applied is determined such that the output voltage V falls within a proper pressurization area. In the event that the pressure falls outside the proper pressurization area, when an alarm is set to be raised using the output voltage V, the matching member 3b in the peripheral portion can be always attached to the back face of the bumper 4 by a properly applied pressure.

It is to be noted that in the above embodiments, it is configured that when the flange 6a of the fixing ring 6 is divided into at least two parts, the mating portions of the divided pieces are made connectable to each other, and also the bases of the divided pieces are bendable; thus, the replacement of the ultrasonic sensor can be easily carried out.

INDUSTRIAL APPLICABILITY

According to the present invention, an ultrasonic sensor and an ultrasonic sensor module having stabilized transmission and reception efficiencies can be obtained, and also these can be attached to the back face of the bumper 4 with good appearance.

The invention claimed is:

1. An ultrasonic sensor attached to the back face of a bumper, comprising: a matching member that is in intimate contact with the opposing faces between an ultrasonic wave transmitting surface of the ultrasonic sensor and the bumper, and that has an acoustic impedance smaller than each of the impedances of the sensor and the bumper, wherein the matching member is composed of a member having a first acoustic impedance and a member having a second acoustic impedance, an aspect ratio is provided in the shape of the contact surface between at least one of the members and the bumper, and the acoustic impedances of the members is given by the following relation:

$$Z21 \gg Z22$$

where

Z21 is the acoustic impedance of a first member in the central portion thereof, and Z22 is the acoustic impedance of a second member in the peripheral portion thereof.

2. The ultrasonic sensor according to claim 1, wherein the first member is made of defoamed silicone, and the second member is made of foamed polystyrene or foamed silicone.

3. The ultrasonic sensor according to claim 1, wherein the matching member is composed of the member having the first acoustic impedance and the member having the second acoustic impedance, and the second member is a cup structure which hangs over the ultrasonic wave transmitting surface thereof.

4. The ultrasonic sensor according to claim 1, wherein a solid matter having a spherical shape or a polygonal shape is mixed into the matching member in the peripheral portion.

5. The ultrasonic sensor according to claim 1, wherein pressure-sensitive rubber is employed for the central matching member to monitor the pressurization condition between the ultrasonic sensor and the bumper, which provides a function raising an alarm when the pressurization value becomes either a certain threshold value or more, or the threshold value or less.

6. The ultrasonic sensor according to claim 1, wherein a projection is provided on either surface of the ultrasonic wave transmitting surface of a metal casing that is a component of the ultrasonic sensor and the abutment surface of the bumper, and a thickness of the matching member interposed on the abutment surface is maintained constant by the projection.

7. The ultrasonic sensor according to claim 6, wherein the aspect ratio of the matching member is changed by the shape of the projection.

8. A method of attaching an ultrasonic sensor including the steps of:

disposing an ultrasonic sensor according to claim 1 in a predetermined position on the back face of a bumper;

pressing a flange of a metal casing that is a component of the ultrasonic sensor with a fixing member; and fixing the fixing member to the bumper under the pressed condition.

9. The method of attaching an ultrasonic sensor according to claim 8, wherein the fixing member includes an urging member that normally presses the flange of the metal casing.

10. The method of attaching an ultrasonic sensor according to claim 8, wherein the urging member is formed in the fixing member.

* * * * *